Sept. 26, 1933.  E. O. BENNETT  1,928,122
FLEXIBLE STUFFING BOX ASSEMBLY
Filed Oct. 28, 1932
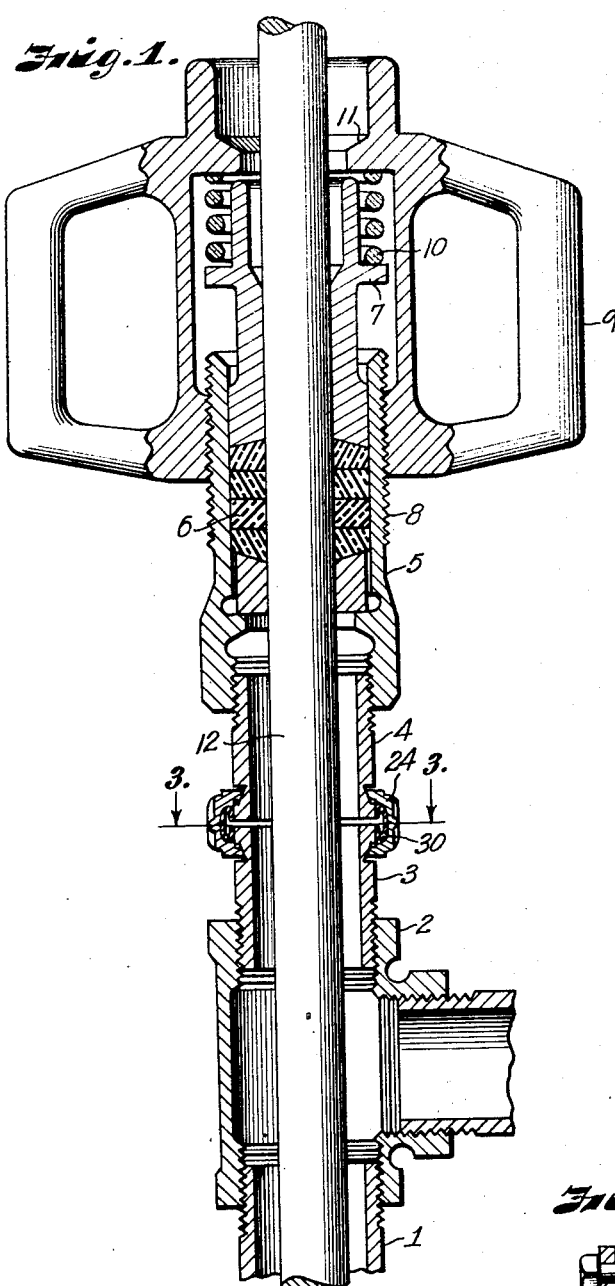
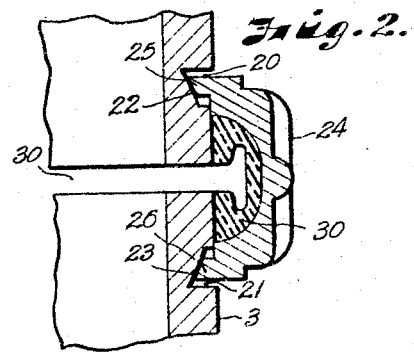
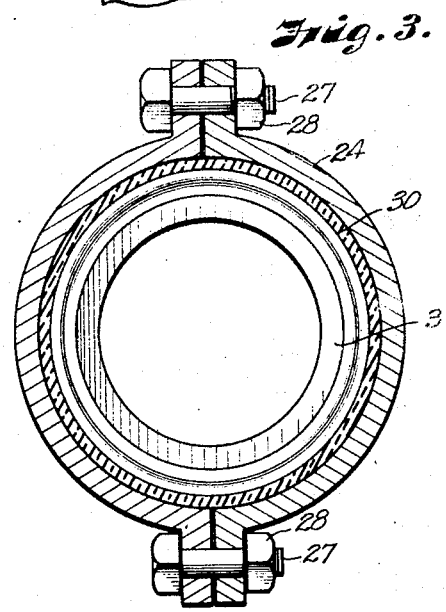
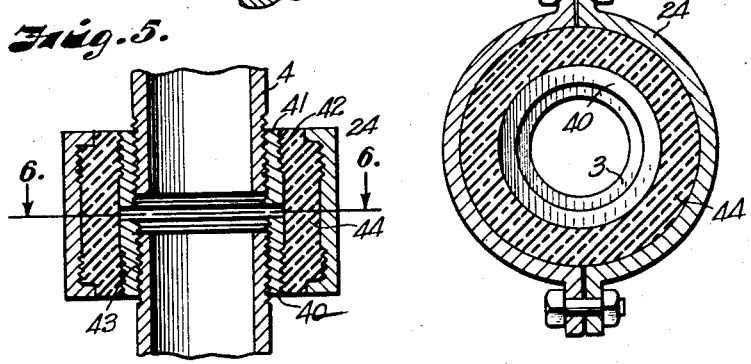
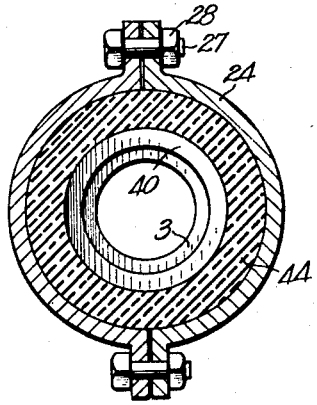
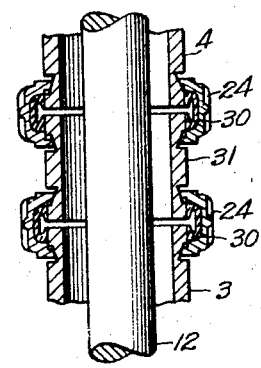
INVENTOR
*Edwin O. Bennett*
BY *Thos. E. Scofield*
ATTORNEY Patented Sept. 26, 1933

1,928,122

UNITED STATES PATENT OFFICE 1,928,122

FLEXIBLE STUFFING BOX ASSEMBLY

Edwin O. Bennett, Ponca City, Okla., assignor to Continental Oil Company, Ponca City, Okla., a corporation of Delaware Application October 28, 1932. Serial No. 639,957

2 Claims. (Cl. 285—22)

My invention relates to a flexible stuffing box assembly, and more particularly to an assembly whereby the stuffing box around the pump rod in a pumping oil well is rendered tight.

The sucker rod in a pumping well is given reciprocating action by a walking beam. In a transmission of this nature, the reciprocating rod undergoes an oscillating or angular motion in addition to its reciprocation. This angular motion works the packing in the stuffing box loose and it soon becomes badly worn on one side or the other, depending upon the direction of the angular motion. When this occurs it begins to leak and both oil and gas escape from the well, producing a fire hazard.

In assembling the sucker rods through the stuffing box it frequently happens that the load of the rods must be taken by the stuffing box and transmitted to the oil well casing. The flexible coupling must be of such a nature that this load can be taken without danger of rupturing or injuring the coupling.

One object of my invention is to provide a stuffing box wherein that portion containing the packing is self-aligning.

Another object of my invention is to provide a stuffing box assembly wherein the packing is flexibly mounted in order to preclude wear due to the angular motion of the reciprocating rod.

A further object of my invention is to provide an assembly wherein wear on the pumping rod will be eliminated.

Another object of my invention is to provide a stuffing box assembly wherein the packing is flexibly mounted and a construction which will enable the load of the sucker rods to be taken directly by the casing.

In the accompanying drawing which forms part of the instant specification and which is to be read in conjunction therewith;

Figure 1 shows a sectional elevation of a stuffing box assembly embodying one mode of carrying out my invention.

Figure 2 shows a fragmentary view on an enlarged scale of my flexible coupling.

Figure 3 shows a sectional view taken on the line 3—3 of Figure 1.

Figure 4 shows a sectional view of a modification of my invention in which a pair of flexible couplings are used to permit of a true lateral motion of the stuffing box.

Figure 5 shows a sectional view of a modification showing another construction for embodying my invention.

Figure 6 shows a sectional view taken on the line 6—6 of Figure 5.

In general, my invention contemplates the provision of a pair of nipples having spherical seats cut in their outer surfaces. A coupling ring is provided with spherical projections adapted to cooperate with the spherical seats in the nipples. The spherical seats in the nipples are disposed at the bottom of respective circumferential grooves. These grooves are wider than the portions of the coupling which are adapted to seat in the grooves. The nipples are normally spaced slightly apart from each other. Between the nipples and the coupling I provide a rubber ring which is adapted to be pressed tightly against the outer surface of the nipples by the coupling member to form an oil and gas tight joint and to normally hold the nipples in spaced relationship. The construction is such that when the load of the sucker rods is placed on the stuffing box, the load will be taken by the grooves of the nipples and transmitted from nipple to nipple through the metallic coupling member so that no undue strains are placed upon the rubber ring. During the pumping action, the stuffing box will be self aligning inasmuch as it will be flexibly supported by the rubber ring.

I provide for a modification in which a pair of threaded sleeves are secured to the stuffing box nipple and to the casing-head nipple. Normally the sleeves are held in separated position through the agency of the rubber sleeve which is securely pressed around the joint by means of a metallic coupling. Normally the stuffing box is supported solely through the rubber ring. When the compression load is spaced on the stuffing box such as when the load of the rods is taken thereby the rubber will be permitted to be compressed to allow the sleeves to contact each other so that the compression load will be transmitted directly to the casing head.

If desired, I may provide for a pair of coupling members connected by a short nipple disposed between them. The purpose of this arrangement is to permit a double angular motion, half of which is taken by each of the respective couplings. This will permit of a true lateral motion of the stuffing box instead of restricting it to an angular motion.

More particularly referring now to the drawing, an oil well tubing 1 terminates in a casing-head 2 to which is connected a nipple 3. The nipple 3 is flexibly connected to nipple 4 by means of a coupling member shown in larger scale at Figure 2. Secured to nipple 4 is an oil well stuffing box assembly 5 having packing rings 6, spring pressed follower member 7 and means threaded to the stuffing box casing 8 comprising a member 9 which is adapted to be screwed downwardly to vary the tension of the spring 10 which engages the follower member 7. The seat 11 is provided in the member 9 on which to seat the sleeves which take load of the sucker rods 12 when assembling the same. The sucker rods 12 pass through the stuffing box and downwardly through the flexible connection into an oil well tubing as can be readily seen from the assembly shown in Figure 1. When the pumping jack is in operation, the sucker rod will have a slight angular motion. This angular motion quickly wears out the stuffing box, does damage to the sucker rods and permits gas and oil leaks to occur with the resulting danger of fire and ensuing loss of property, and possibly of life. The result is that, under present practice, the oil well stuffing boxes are renewed frequently, often at intervals of every three days. As pointed out above, I am able to obviate the difficulty by flexibly supporting the stuffing box so that it is self-aligning and will accompany the angular motion of the rod during the pumping operation without excessive wear. The nipples 3 and 4 are provided with grooves 20 and 21 extending around through outer circumferences. The bottom surfaces of the grooves 22 and 23 are segments of a sphere whose center lies along the axis of the nipples. A coupling ring 24 which may be of any suitable type is provided with projecting portions 25 and 26. These projecting portions terminate in spherical surfaces adapted to coact with the spherical surfaces 22 and 23. The width of the projections which are seated in the grooves 20 and 21 is less than the width of the grooves. The coupling member 24 is shown in the accompanying drawing as a split ring held together by bolts 27 and nuts 28. Disposed between the inner surface of the coupling member 24 and the nipples 3 and 4 is a live rubber ring 30. The arrangement is such that, when the upper surface of the projection 25 is seated against the upper surface of the grooves 20 and the lower surface of the projection 26 is seated against the lower surface of the groove 21, the respective ends of the nipples 3 and 4 will be spaced. In other words, there is always a space 30 between the nipples. This will insure a free angular motion at all times. The rubber ring 30 seals the space. The coupling member 24 may be adjusted by means of bolts 28 to secure an extremely tight joint. An actual test shows that over 2500 pounds per square inch hydraulic pressure may be imposed upon this joint without leakage. Normally the resiliency of the rubber is sufficient to support the stuffing box by means of friction, the weight of the stuffing box being transmitted through the rubber ring 30. When the weight of the rods is imposed upon the assembly, the rubber will be compressed and the load taken through the coupling member 24 as will be readily appreciated from the description above.

In the modification shown in Figure 4, a pair of coupling members are employed connected by an intermediate nipple 31. The grooves in each case are provided with spherical seats and the coupling members 24 are provided with spherical projections, the construction being the same as that just described. In this construction the angular motion is distributed between the two coupling members with the result that the stuffing box will have a substantially true lateral motion instead of merely an angular one.

In the modification shown in Figure 5, a nipple 3 is provided with a threaded sleeve 40. The nipple 4 is provided with a threaded sleeve 41. The sleeves 40 and 41 are provided with surfaces 42 and 43 against which is seated a rubber ring 44. The rubber ring is tightly pressed against the roughened surface of the sleeves 40 and 41 by means of a coupling member 24. Normally the stuffing box will be supported through the nipple 4, the sleeve 41, the rubber ring 44, the sleeve 40, the nipple 3, and the casing head. Inasmuch as the assembly will be flexibly supported, any angular motion of the rod will be compensated for. When the weight of the sucker rods is placed upon the assembly, the rubber ring 44 will be compressed until the ends of the sleeves 40 and 41 meet so that the load will be transmitted from nipple 4 through sleeve 41 to sleeve 40, to nipple 3, to the casinghead, thus eliminating high compression loads from the rubber ring. It will be readily understood that the compression load of the sucker rods will be very great due to the fact that in deep wells the string of sucker rods is often about a mile long and it is not unusual for the rods to be half a mile in length.

It will be appreciated that I have accomplished the objects of my invention. I have provided a unit for coupling stuffing boxes to oil well tubing in pumping oil wells, in such a manner that the angular motion is permitted to take place about the center of the coupling, enabling the stuffing box to follow the polish rod. At the same time, a degree of axial motion is permitted to enable high compression loads to be taken by metal thus relieving it from the flexible member.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Means for mounting a stuffing box for a well pump rod comprising a nipple secured to a well casing, a second nipple in axial alignment therewith and normally spaced therefrom secured to the stuffing box, a ring of resilient material surrounding the free ends of said nipples and forming a connection therebetween which normally holds them spaced apart, means for securing said ring in liquid and gas tight relation with said nipples, the resiliency of the ring providing for a slight angular movement of the stuffing box to accommodate it to movements occasioned by pumping operations and to permit the load of the sucker rods to be supported independent of the resilient ring.

2. Means for mounting a stuffing box for a well pump rod comprising a nipple secured to a well casing, a second nipple in axial alignment therewith and normally spaced therefrom secured to the stuffing box, peripheral grooves formed in said nipples adjacent the free ends thereof, the bottoms of said grooves being formed on a substantially spherical surface, a coupling ring having projections provided with surfaces substantially formed on a sphere, said surfaces adapted to seat against the bottoms of the grooves, a ring of resilient material positioned between said coupling ring and said nipples adapted to seal the space between the nipples said ring normally holding said nipples apart, the resiliency of the ring being such as to provide for a slight angular movement of the stuffing box to accommodate it to movements occasioned by pumping operations and to permit the load of the sucker rods to be taken by the coaction of the coupling ring and the nipple grooves independent of the resilient ring.

EDWIN O. BENNETT.